United States Patent [19]

Orr et al.

[11] 4,368,789

[45] Jan. 18, 1983

[54] DRILLING APPARATUS

[75] Inventors: Thomas M. Orr, Greensburg; Paul V. Baker, Indiana, both of Pa.

[73] Assignee: Orr . . . Screw Machine Products, Inc., Greensburg, Pa.

[21] Appl. No.: 203,494

[22] Filed: Nov. 3, 1980

[51] Int. Cl.³ .................... E21B 10/38; E21B 12/00
[52] U.S. Cl. ................................ 175/418; 175/415; 175/315; 175/320; 403/361; 403/378
[58] Field of Search ............... 175/320, 321, 414–418, 175/327, 419, 420; 285/404, 319, 15; 403/361, 378, 379; 279/19.5, 20; 408/57–60

[56] References Cited

U.S. PATENT DOCUMENTS

| | | | |
|---|---|---|---|
| 1,136,987 | 4/1915 | Wakfer | 175/415 |
| 2,037,307 | 4/1936 | Bowman | 403/361 X |
| 2,101,864 | 12/1937 | McCallum | 175/419 X |
| 2,294,004 | 8/1942 | Serafino | 175/415 |
| 2,716,564 | 8/1955 | Lofqvist | 285/319 |
| 4,083,415 | 4/1978 | Kita et al. | 175/410 X |
| 4,099,585 | 7/1978 | Emmerich | 175/320 |
| 4,190,128 | 2/1980 | Emmerich | 174/320 X |

Primary Examiner—Ernest R. Purser
Attorney, Agent, or Firm—Webb, Burden, Robinson & Webb

[57] ABSTRACT

A drill steel and a drill bit having a tip with a cutting element and a hollow open ended shank forming a polygonal socket which is fitted onto a complementary engagement portion at one end of the drill steel so that rotation of the drill steel rotates the bit. The engagement portion of the drill steel has an axial slot to hold a spring retainer clip with a protrusion. A slot is formed in the shank of the drill bit to receive the protrusion on the spring retainer clip to hold the bit in the axial position on the drill steel. An opening in the shank of the drill bit and a pin extending through the opening and through the axial slot in the engagement portion of the drill steel when a spring retainer clip is not located in the slot. Axial openings in the tip of the drill bit communicate with the socket for the passage of either liquid or compressed air to the cutting element of the drill bit or for creating a vacuum at the cutting element, and an axial passage extends through the drill steel for supplying liquid or compressed air to the socket in the drill bit or for creating a vacuum in the socket of the drill bit.

10 Claims, 6 Drawing Figures

U.S. Patent    Jan. 18, 1983    4,368,789
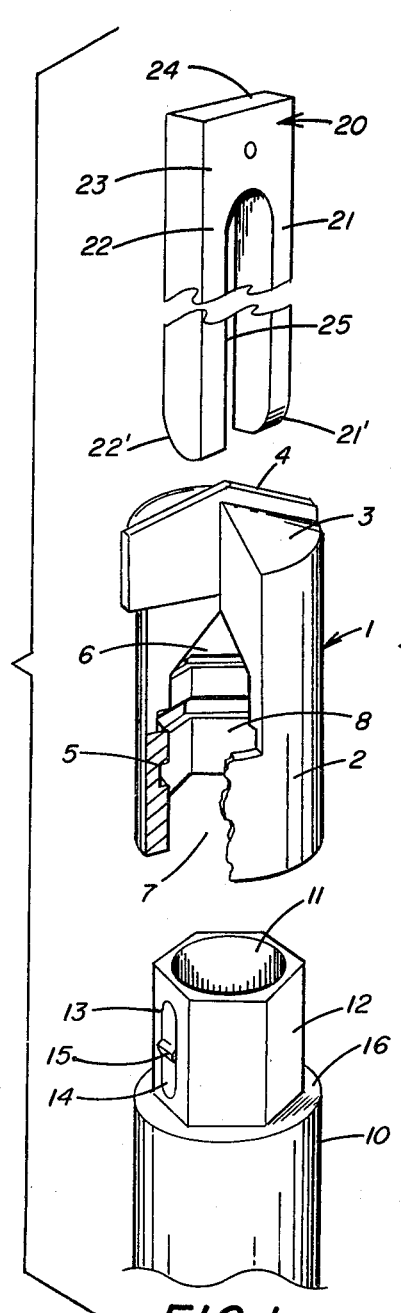
FIG. 1
PRIOR ART
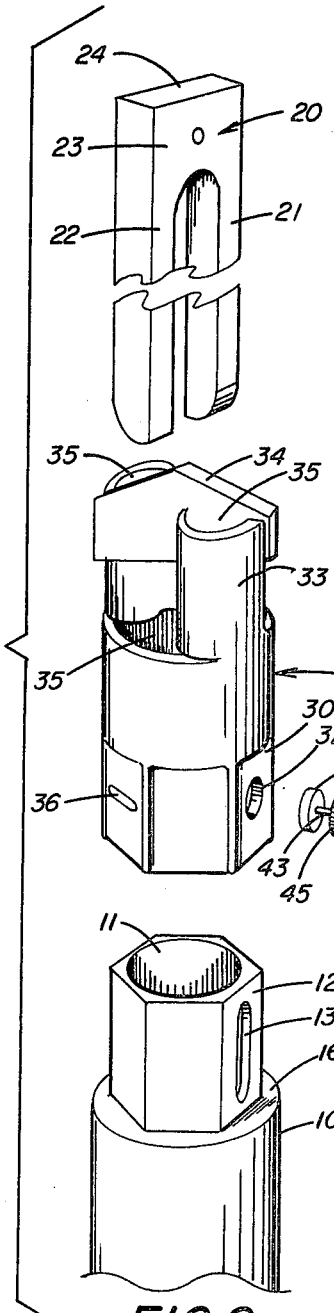
FIG. 2
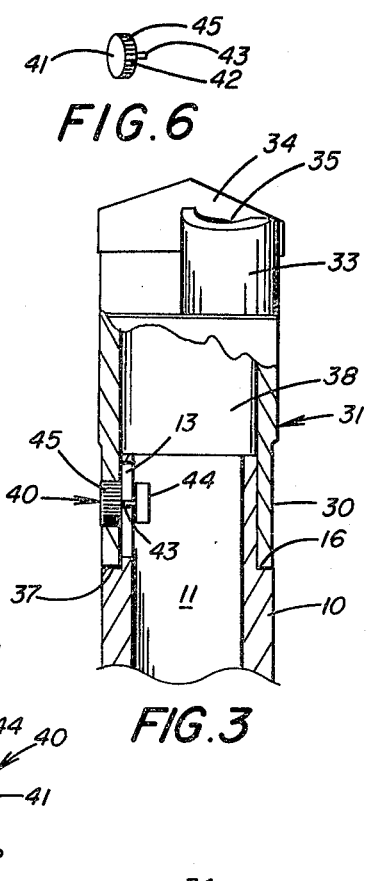
FIG. 6
FIG. 3
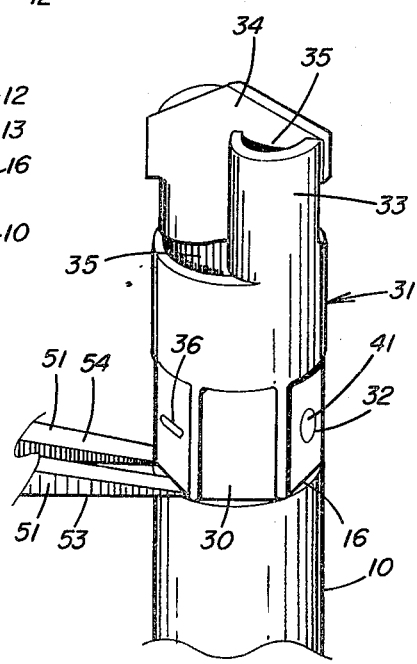
FIG. 4
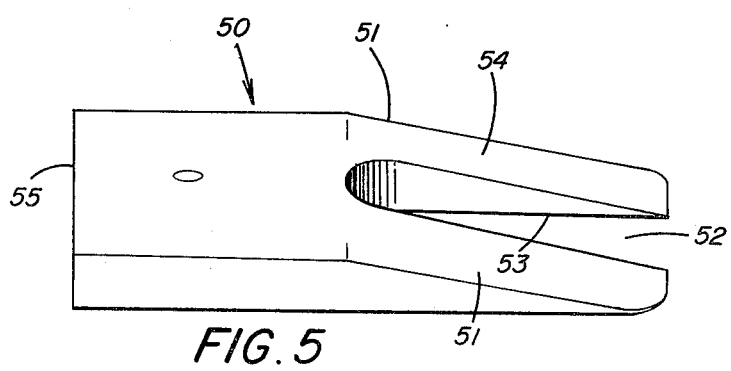
FIG. 5

DRILLING APPARATUS

It is common practice to drill bolt holes in mine roofs to receive roof bolts in order to prevent roof fall. In drilling such holes, a drill bit is mounted on the upper end of an elongated drill steel which is driven by a motor while being moved upwardly to force the drill bit into the mine roof. When the hole for the roof bolt is drilled to the desired depth, the drill steel is lowered from the hole along with the drill bit. In the present apparatus, the drill bit is attached to the upper end of the drill steel by a spring clip having an outwardly extending protrusion which cooperates with an internal notch, groove or hole formed in the drill bit. In many instances when a drill steel is lowered from a hole, the protrusion on the spring clip which holds the bit on the upper end of the drill steel is broken, and the drill bit remains in the hole and cannot be recovered. Even if the drill bit does not stick in the hole when the clip is broken, the drill steel cannot be reused after the protrusion is broken since a drill bit might stick in the next hole and be lost during the next drilling operation.

Drill bits are expensive and it is desirable to reuse each bit until the cutting tip is completely worn away. Our invention makes it possible to mount a drill bit on a drill steel after the protrusion on the clip of the drill steel has broken while retaining the drill bit so that it is not lost in the hole when the drill steel is removed. Additionally, our invention makes it possible to reuse a drill steel with a broken clip protrusion without transporting the drill steel to a shop for repair.

The object of our invention is an apparatus for attaching a drill bit to the end of a drill steel when the spring clip is lost or after the spring clip protrusion on the drill steel is broken so that the drill bit will not stick in a hole and may be reused. A second object of the invention is to provide an inexpensive and rapid method for attaching a drill bit to the end of a drill steel having a broken spring clip at the job site rather than having to transport the drill steel to a machine shop to replace the spring clip.

These and other objects of our invention will become more apparent from the following description in connection with the drawings in which:

FIG. 1 is an exploded view of a drill steel, a drill bit according to the prior art and a tool for attaching the bit to the drill steel;

FIG. 2 is an exploded view of a drill steel, a drill bit and a tool for attaching the bit to the drill steel according to our invention;

FIG. 3 is a partial vertical section through a drill steel with a drill bit attached according to our invention;

FIG. 4 is a view of a drill bit attached to a drill steel with the operative end of a disassembly tool according to our invention inserted therebetween;

FIG. 5 is a perspective view of the disassembly tool according to our invention; and FIG. 6 is another embodiment of a retainer according to our invention.

The prior art drill bit 1 shown in FIG. 1 has a shank 2 and a tip 3. A cutting element 4 which may be a high speed steel or a carbide material is fixed in a slot in the tip 3 by welding or brazing in a manner well known to those skilled in the art. The inside of shank 2 is hollow to form a socket 6 having an open bottom 7. The socket 6 is hexagonal in cross section and has a surface 8 formed with an annular groove 5. The socket is relieved at its upper end to provide openings so that air, water or a lubricant can be supplied to cutting element 4 on tip 3 during cutting.

Bit 1 is attached to a drill steel 10 which has an axial passage 11 extending throughout its length to permit compressed air, water or a lubricant to be supplied to socket 6 in shank 2 or to permit a vacuum to be created in the socket. The upper end of drill steel 10 is formed with a hexagonal engagement portion 12 which fits into the hexagonal socket of shank 2 in drill bit 1 so that rotation of the drill steel rotates the drill bit. The lower end of drill steel 10 is also formed with a hexagonal engagement portion (not shown) which will fit into either a coupler for attaching a drill steel extension for a drive member for rotating the drill steel. One face of hexagonal engagement portion 12 of the drill steel is formed with an elongated axially extending slot 13. A spring clip 14 having a protrusion 15 fits tightly into slot 13 and is firmly held in position in the slot. When a drill bit 1 is fitted on the end of drill steel 10, protrusion 15 of spring clip 14 is located in annular groove 5 in inner surface 8 of socket 6 in the shank of the drill bit. Since annular groove 5 extends completely around inner surface 8 of socket 6, the alignment of the socket with engagement portion 12 on the drill steel is not important. Location of protrusion 15 in annular groove 5 holds the drill bit against axial movement relative to the drill steel.

Assembly tool 20 shown in FIG. 1 has parallel spaced arms 21 and 22 and a head portion 23 with a striking surface 24. Slot 25 is located between arms 21 and 22 to overlie the cutting element on tip 3 of the drill bit when the tool is positioned on a bit. The lower corners of arms 21 and 22 are respectively rounded at 21' and 22', and the rounded corners of the arms face in opposite directions. Corners 21' and 22' are rounded so that when tool 20 is placed on drill bit 1 in its operative position, the rounded corners will contact rounded portions at the upper end of shank 2 of the drill bit.

When it is desired to assemble a bit 1 on a drill steel 10, opening 7 of socket 6 of the bit is aligned with hexagonal engagement portion 12 of the drill steel and is lowered until the bottom end of shank 2 contacts protrusion 15 on spring clip 14. At this point assembly tool 20 is fitted over the cutting element of the drill bit and is lowered until rounded corners 21' and 22' contact the upper end of shank 2 but with no contact between the assembly tool and cutting element 4. This is important because tungsten carbide is an extremely hard and brittle material, and if it is struck with a hard object to drive the bit onto the drill steel, the cutting element can crack or chip. This renders the bit useless and may cause injury to the operator. When the assembly tool and the end of the shank are in contact, striking surface 24 is hit with a hammer to drive socket 6 of the bit onto the drill steel which depresses protrusion 15 on spring clip 14 a sufficient amount to permit the drill bit to move downwardly on hexagonal engagement portion 12 until the lower end of shank 2 contacts shoulder 16 on the drill steel at which point protrusion 15 of spring clip 14 is located in annular groove 5 on inner surface 8 of socket 6. Thus, the drill bit is firmly held on the drill steel against movement in any direction relative to the drill steel.

The arrangement of our invention solves the problem which occurs when the protrusion on a spring clip such as shown in FIG. 1 breaks off. When this occurs, the operator may continue boring the hole for a roof bolt, but when the hole reaches the desired depth and the drill steel is withdrawn, the drill bit often remains stuck in the hole. In some instances the drill bit will fall out of the hole when the drill steel is withdrawn even though the spring clip protrusion has broken. When this happens it is possible to reuse the drill bit, but since the spring clip protrusion is broken, the drill steel should not be used again since the next time it is withdrawn from a hole, the drill bit may remain in the hole. In order to overcome this problem caused by a broken clip protrusion, the shank 30 of our novel drill bit 31 shown in FIGS. 2–4 is provided with flat exterior faces corresponding to the faces of the hexagonal socket 38 in drill bit shank 30. One or more of the faces is provided with a circular hole 32 extending completely therethrough for a purpose described hereinafter.

The tip 33 of drill bit 31 is provided with a cutting element 34 of high speed steel or a carbide material which is attached to tip 33 in the same conventional manner as cutting element 4 in FIG. 1. Our drill bit is manufactured in such a way that it has four openings designated 35 to permit the passage of compressed air, water or a lubricant to tip 4 during cutting or to create a vacuum at the tip. Two of the openings are located adjacent the cutting edge of cutting tip 34, and the other two openings are located at the juncture between shank 30 and tip 33.

One of the hexagonal faces of the shank of our bit is provided with a slot 36 extending substantially perpendicular to the axis of the bit which cooperates with the protrusion on a spring clip 14 on hexagonal engagement portion 12 of drill steel 10 to hold the bit in position on the drill steel. However, if protrusion 15 on spring clip 14 is broken and it is desired to attach a bit to the end of the drill steel, spring clip 14 is knocked out of slot 13 and the slot is left open as shown in FIGS. 2 and 3. The socket 38 of bit 31 of our invention is placed over the hexagonal engagement portion 12 of the drill steel and positioned so that a hole 32 in a flat face of shank 30 is aligned with slot 13 on hexagonal engagement portion 12 of the drill steel. The drill bit is then driven onto engagement portion 12 with a tool 20, and a retainer 40 is inserted into the hole 32 and driven inwardly until face 41 of disc 42 is flush with the surface of a face on shank 30 as shown in FIG. 3 of the drawings. The disc 42 has a serrated edge 45 to insure a tight fit with hole 32 when the serrations contact the periphery of the hole. A pin 43 is attached to the face of disc 42 opposite face 41 and extends at a right angle thereto. A second disc 44 may be attached to the opposite end of pin 43 in the manner shown in FIGS. 2 and 3 of the drawings. In the position shown in FIG. 3, pin 43 extends through slot 13 in engagement portion 12 of the drill steel, and the disc 44 is located in the axial passage 11 of the drill steel. It will be readily apparent that in this position the drill bit can only move axially relative to the drill steel until pin 43 contacts the upper edge of slot 13. The drill bit is retained on the end of a drill steel even though there is no spring clip on the drill steel. The retainer may also be formed without a disc 44 attached to an end of pin 43 as shown in FIG. 6 of the drawings. If the retainer is constructed in this manner, pin 43 will act in the same manner as described above.

When a drill bit is to be removed from a drill steel, a disassembly tool 50 shown in FIG. 5 of the drawings is used. The end of the tool is inserted between the shoulder 16 on the drill steel and the end 37 of shank 30 on the bit in the manner shown in FIG. 4 of the drawings. The disassembly tool has a pair of spaced prongs 51 which define a slot 52 therebetween. Each prong 51 is formed with a flat face 53 and an angular face 54 so that each prong is in the shape of a wedge. When the disassembly tool is used, the external ends of prongs 51 are inserted at the contact line between shoulder 16 on the drill steel and the end 37 of shank 30 on the drill bit. The striking end 55 of tool 50 is hit with a hammer to drive the wedge shaped prongs 51 between the drill bit and shoulder 16 on the drill steel to move the drill bit axially relative to the drill steel to separate them. Relative axial movement of the drill bit and the drill steel will either depress a spring clip or shear off pin 43 of retainer 40 after which the drill bit socket may be slid off of hexagonal engagement portion 12 of the drill steel.

Our novel drill bit and attachment arrangement when used with our tools makes it possible to quickly and inexpensively attach a drill bit to a drill steel with a spring clip in place or after the drill steel spring clip protrusion has broken. This is advantageous as it can be done quickly at the drilling site in the mine rather than having to transport the drill steel to a machine shop for repair. As a result of our invention, a drill tip is removed from a hole along with the drill steel and may be reused until the cutting element is completely worn. This results in a substantial savings to the mine operator since it is not necessary to replace new or partially worn drill bits which become stuck in a hole. Furthermore, our invention makes it possible to quickly remove a bit from a drill steel for any purpose.

While we have described a preferred embodiment of our invention, it should be understood that it may be embodied within the scope of the appended claims.

We claim:

1. A drill bit having a tip and a shank attached thereto, a cutting element carried by said tip, said shank being hollow and open at an end to form a socket adapted to fit on the end of a drill steel, an elongated slot formed in said shank and at least one hole formed in said shank, said elongated slot and said hole being located in the same transverse plane through said shank, whereby said slot is adapted to receive a protrusion on a drill steel and said hole is adapted to receive a retainer which extends into said hollow shank.

2. A drill bit as set forth in claim 1 wherein said socket has a wall formed with a plurality of flat faces adapted to contact flat faces on an engagement portion at the end of a drill steel, the exterior of said shank being formed with flat faces located in complementary relationship to said flat faces forming the wall of said socket, said slot being located in one of said flat faces and said hole being located in another of said flat faces.

3. A drill bit as set forth in claims 1 or 2 having a plurality of holes in said shank, all of said plurality of holes located in the same transverse plane as said elongated slot.

4. A drill bit as set forth in claim 1 including a plurality of axial openings formed in said bit for supplying a fluid to said cutting element.

5. A drill bit as set forth in claim 1 wherein said socket has a hexagonal cross section.

6. The combination of a drill bit and a drill steel, said drill bit having a tip with a cutting element and a shank extending from said tip, said shank having a polygonal cross section and being hollow and having an open end to form a socket, said drill steel having an engagement portion with a polygonal cross section at one end thereof, said socket in said drill bit being fitted over said engagement portion of said drill steel whereby rotation of said drill steel will rotate said drill bit, said engagement portion of said drill steel having an axial slot formed therein, resilient means retained in said slot, an elongated slot formed in said shank and at least one opening formed in said shank, said elongated slot and said opening being located in the same transverse plane through said shank, said elongated slot adapted to cooperate with said resilient means to hold said drill bit in axial position on said engagement portion of said drill steel.

7. The combination set forth in claim 6 wherein said resilient means is a spring clip having a protrusion formed thereon, said protrusion extending into said elongated slot formed in said shank.

8. The combination of a drill bit and a drill steel, said drill bit having a tip with a cutting element and a hollow shank having an open end to form a socket, said drill steel having an engagement portion at one end thereof, said socket in said drill bit being fitted over said engagement portion of said drill steel whereby rotation of said drill steel will rotate said drill bit, said engagement portion of said drill steel having an axial slot formed therein, a plurality of openings in said shank, one of said openings in said shank being aligned with said axial slot, a disc located in said opening in said shank and a pin having a first end attached to a face of said disc and extending from said face of said disc through said slot and having a second end located within said socket to retain said drill bit in axial position on said engagement portion of said drill steel.

9. The combination set forth in claim 8 wherein said second end of said pin has a second disc attached thereto, whereby said second disc is located within said socket.

10. The combination set forth in claims 8 or 9 wherein said disc in said opening has a serrated periphery in contact with the periphery of said opening to firmly maintain said disc in said opening in said shank.

* * * * *